US012636856B2

(12) United States Patent (10) Patent No.: US 12,636,856 B2
Kitazawa et al. (45) Date of Patent: May 26, 2026

(54) LAYERED BODY STRUCTURE AND METHOD FOR MANUFACTURING LAYERED BODY STRUCTURE

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 192 days.

(21) Appl. No.: 18/015,233

(22) PCT Filed: Dec. 28, 2020

(86) PCT No.: PCT/JP2020/049185

§ 371 (c)(1),
(2) Date: Jan. 9, 2023

(87) PCT Pub. No.: WO2022/144998

PCT Pub. Date: Jul. 7, 2022

(65) Prior Publication Data

US 2023/0302767 A1     Sep. 28, 2023

(51) Int. Cl.
B32B 7/03          (2019.01)
B29C 70/54          (2006.01)
(Continued)

(52) U.S. Cl.
CPC .............. *B32B 7/03* (2019.01); *B29C 70/545*
(2013.01); *B32B 3/26* (2013.01); *B32B 5/26*
(2013.01); *B32B 7/09* (2019.01)

(58) Field of Classification Search
CPC .... B32B 7/03; B32B 7/09; B32B 3/26; B32B
5/26; B29C 70/545
See application file for complete search history.

(56) References Cited

U.S. PATENT DOCUMENTS

2020/0180260 A1*   6/2020   Crawford, III ......... B32B 27/06

FOREIGN PATENT DOCUMENTS

JP          H02-115236 A        4/1990
JP          2008-273176 A      11/2008
(Continued)

OTHER PUBLICATIONS

PCT/ISA/210, "International Search Report for PCT International Application No. PCT/JP2020/049185," Mar. 9, 2021.

*Primary Examiner* — Frank J Vineis
*Assistant Examiner* — Laura B Figg
(74) *Attorney, Agent, or Firm* — HAUPTMAN HAM, LLP

(57)          ABSTRACT

A charge is formed of a plurality of layers of fiber-reinforced sheets. The charge includes an outermost-layer multi-stack member disposed at each end section in a layering direction; and an intermediate-layer multi-stack member disposed in an intermediate section in the layering direction. The outermost-layer multi-stack member includes a fiber-reinforced sheet in which fibers extend in an X-axis direction in which compression force or tensile force acts when the charge is subjected to bending processing; and has formed therein a plurality of incisions that penetrate in the layering direction and extend in a Y-axis direction. The plurality of incisions are disposed side by side at prescribed intervals in the Y-axis direction and the X-axis direction. An incision that penetrates in the layering direction and extends in the Y-axis direction is formed in the intermediate-layer multi-stack member. The incision extends roughly the entire region affected by compression force or tensile force.

5 Claims, 9 Drawing Sheets

(51) Int. Cl.
B32B 3/26 (2006.01)
B32B 5/26 (2006.01)
B32B 7/09 (2019.01)

(56) References Cited

FOREIGN PATENT DOCUMENTS

| | | | |
|---|---|---|---|
| JP | 2009-019201 | A | 1/2009 |
| JP | 4779754 | B2 | 9/2011 |
| JP | 5180606 | B2 | 4/2013 |
| JP | 2015-163660 | A | 9/2015 |
| JP | 2016-180037 | A | 10/2016 |

* cited by examiner

LAYERED BODY STRUCTURE AND METHOD FOR MANUFACTURING LAYERED BODY STRUCTURE

RELATED APPLICATIONS

The present application is National Phase of International Application No. PCT/JP2020/049185 filed Dec. 28, 2020, the disclosure of which is hereby incorporated by reference herein in its entirety.

TECHNICAL FIELD

The present disclosure relates to a laminate structure and a method for manufacturing a laminate structure.

BACKGROUND ART

A composite material, for example, carbon fiber-reinforced plastic (CFRP) is sometimes used for an aircraft component such as an aircraft fuselage or a main wing. A structural member (a composite structure) made of CFRP, which configures an aircraft component, has any cross-sectional shape. As one of the methods for manufacturing such a composite structure, there is a method for manufacturing a flat or nearly flat laminate (also called a charge) by laminating a plurality of fiber-reinforced sheets, and performing bending on the laminate to provide any cross-sectional shape.

In a case of manufacturing a component having a cross-sectional shape change, twist, or curvature by such a method, bending is performed on the laminate so as to obtain a shape having curvature. At this time, in a curvature region of the laminate, a difference in peripheral length occurs between the inner side and the outer side. However, the fiber-reinforced sheet does not have stretchability in a direction in which the fibers extend. Therefore, in a case where the fibers extend in the direction in which a compressive force or a tensile force acts when bending is performed, the fiber-reinforced sheet cannot absorb a difference in peripheral length, so that there is a possibility that wrinkles may easily occur in the laminate. If wrinkles occur in the laminate, there is a possibility that strength may be reduced.

In order to solve such a problem, it is known to form slits that cut the fibers in a reinforcing fiber sheet (for example, PTL 1).

In PTL 1, the slits are formed in a direction orthogonal to the fiber direction or at a predetermined angle in prepreg preforms 2a to 2d composed of reinforcing fibers oriented in one direction and a matrix resin. Further, prepreg preforms 3 and 4 disposed on the front and back surfaces of a prepreg laminated preform 2 are configured only with continuous fibers in which reinforcing fibers are not cut.

CITATION LIST

Patent Literature

[PTL 1] Japanese Patent No. 4779754

SUMMARY OF INVENTION

Technical Problem

When manufacturing a laminate, there is a case of simplifying the process of manufacturing the laminate by lamination of a fiber-reinforced sheet laminate in which a plurality of fiber-reinforced sheets are laminated in advance, instead of laminating fiber-reinforced sheets one by one. PTL 1 does not consider forming slits in such a fiber-reinforced sheet laminate.

In a case where a fiber-reinforced sheet in which fibers extend in a direction in which a compressive force or a tensile force acts when bending is performed is included in a fiber-reinforced sheet laminate, it is desirable that slits that cut the fibers are formed in the fiber-reinforced sheet laminate in order to suppress the occurrence of wrinkles. As a method of cutting the fibers of the fiber-reinforced sheet laminate, a method of forming continuous and long slits in the fiber-reinforced sheet laminate is conceivable. However, for example, in a case where a fiber-reinforced sheet laminate is configured with dry fiber-reinforced sheets with no or weak interlayer adhesion, there is a possibility that problems such as a fiber-reinforced sheet curling up or the fiber-reinforced sheets apart coming may easily occur. Therefore, in a case where the continuous and long slits are formed in the fiber-reinforced sheet laminate that is disposed in the outermost layer of a laminate structure, there is a possibility that the shape of the entire laminate structure may collapse.

On the other hand, in order to prevent the shape of the entire laminate structure from collapsing, it is conceivable not to form a slit in the fiber-reinforced sheet laminate that is disposed in the outermost layer. However, in a case where the fiber-reinforced sheet laminate includes a fiber-reinforced sheet in which fibers extend in a direction in which a compressive force or a tensile force acts, there is a possibility that the effect of improving the shaping-ability may not be obtained in the fiber-reinforced sheet. Therefore, there is a possibility that the improvement of the shaping-ability of the entire laminate structure may be suppressed.

The present disclosure has been made in view of such circumstances, and has an object to provide a laminate structure and a method for manufacturing a laminate structure, in which it is possible to easily maintain a shape.

Further, an object of the present invention is to provide a laminate structure and a method for manufacturing a laminate structure, in which it is possible to improve shaping-ability.

Solution to Problem

A laminate structure according to an aspect of the present disclosure is a laminate structure that is obtained by laminating a plurality of fiber-reinforced sheet laminates, in each of which a plurality of fiber-reinforced sheets are laminated, the laminate structure including: a first fiber-reinforced sheet laminate that is the fiber-reinforced sheet laminate which is disposed at an end portion in a lamination direction; and a second fiber-reinforced sheet laminate that is the fiber-reinforced sheet which laminate is disposed at an intermediate portion in the lamination direction, in which the first fiber-reinforced sheet laminate has the fiber-reinforced sheet in which fibers extend in a direction along a direction in which a compressive force or a tensile force acts when bending is performed on the laminate structure, and is formed with a plurality of slits penetrating in the lamination direction and extending in a first predetermined direction, the plurality of slits that are formed in the first fiber-reinforced sheet laminate are disposed side by side at predetermined intervals in the first predetermined direction and a first intersection direction that is a direction intersecting the first predetermined direction, the second fiber-reinforced sheet laminate is formed with a slit penetrating in the lamination direction and extending in a second predetermined direction, and the slit that is formed in the second fiber-reinforced sheet laminate is formed such that a length in the second predetermined direction of the slit has a length extending over substantially an entire area of a region where a compressive force or a tensile force acts when bending is performed on the laminate structure.

A method for manufacturing a laminate structure according to an aspect of the present disclosure is a method for manufacturing a laminate structure that is obtained by laminating a plurality of fiber-reinforced sheet laminates, in each of which a plurality of fiber-reinforced sheets are laminated, the method including: a first fiber-reinforced sheet laminate slitting step of forming a plurality of slits penetrating in a lamination direction and extending in a first predetermined direction in a first fiber-reinforced sheet laminate that is the fiber-reinforced sheet laminate which is disposed at an end portion in the lamination direction in a case where the first fiber-reinforced sheet laminate has the fiber-reinforced sheet in which fibers extend in a direction along a direction in which a compressive force or a tensile force acts when bending is performed on the laminate structure; and a second fiber-reinforced sheet laminate slitting step of forming a slit penetrating in the lamination direction and extending in a second predetermined direction in a second fiber-reinforced sheet laminate that is the fiber-reinforced sheet laminate which is disposed at an intermediate portion in the lamination direction, in which in the first fiber-reinforced sheet laminate slitting step, the plurality of slits are formed so as to be disposed side by side at predetermined intervals in the first predetermined direction and a first intersection direction that is a direction intersecting the first predetermined direction, and in the second fiber-reinforced sheet laminate slitting step, the slit is formed such that a length in the second predetermined direction of the slit has a length extending over substantially an entire area of a region where a compressive force or a tensile force acts when bending is performed on the laminate structure.

Advantageous Effects of Invention

According to the present disclosure, it is possible to easily maintain the shape of the entire laminate structure.

Further, it possible to improve the shaping-ability of the entire laminate structure.

DESCRIPTION OF EMBODIMENTS

An embodiment of the present disclosure will be described with reference to FIGS. 1 to 9. In the present embodiment, a charge (a laminate structure) 2 is manufactured by laminating a plurality of multi-stack materials (fiber-reinforced sheet laminates) 1, in each of which a plurality of fiber-reinforced sheets are laminated, and a composite structure 3 having a desired shape is manufactured by performing bending on the charge 2. The composite structure 3 is used, for example, for a stringer, a spar, a frame, a rib, or the like, which is an aircraft component configuring an aircraft structure.

In the following description, description will be made with a plate thickness direction (a) lamination direction) of the charge 2 defined as a Z-axis direction, one of directions that are included in a plane orthogonal to the Z-axis direction defined as an X-axis direction, and a direction orthogonal to the Z-axis direction and the X-axis direction defined as a Y-axis direction. In the present embodiment, since an example in which the Z-axis direction is regarded as an up-down direction will be described, there is also a case where the Z-axis direction is described as the up-down direction.

Figure 1:
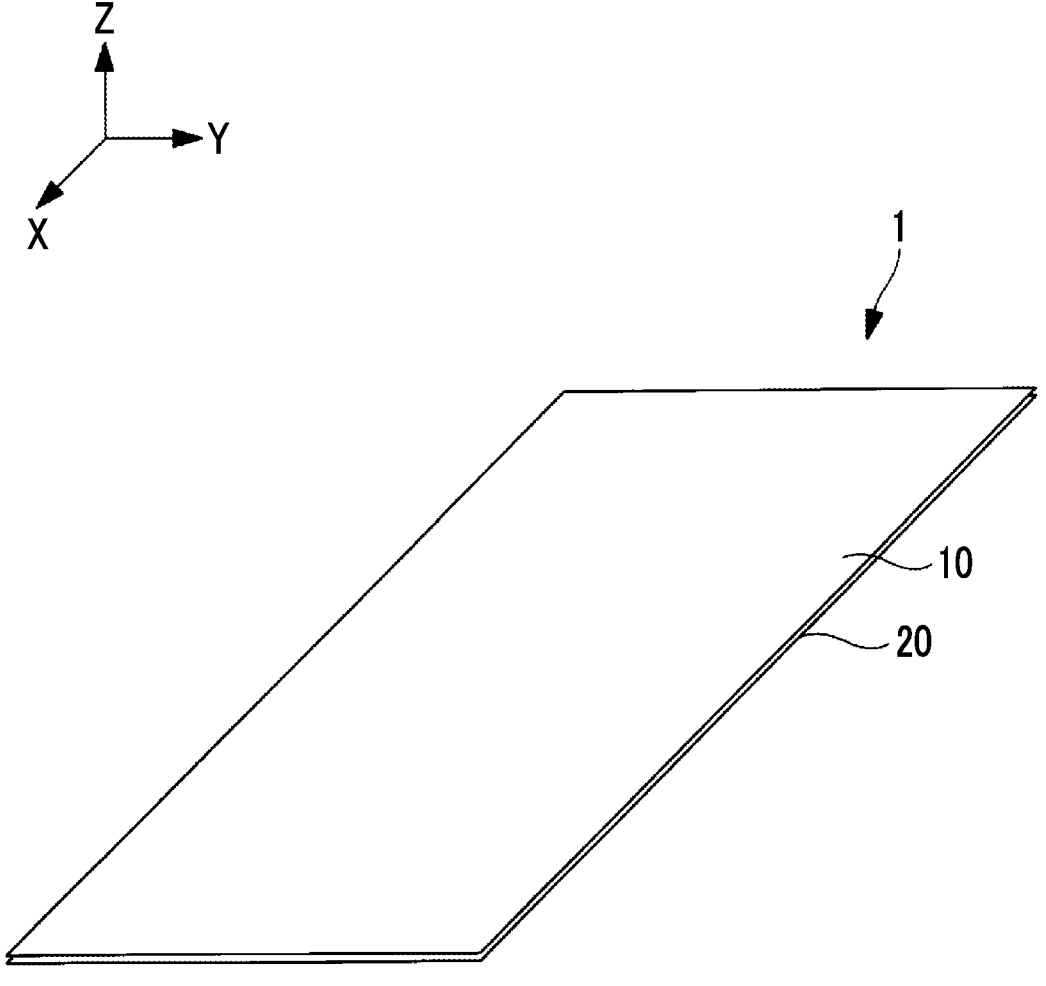
FIG. 1 is a perspective view of a multi-stack material according to an embodiment of the present disclosure.

The multi-stack material 1 according to the present embodiment includes a first fiber-reinforced sheet 10 and a second fiber-reinforced sheet 20 which are laminated, as shown in FIG. 1. The first fiber-reinforced sheet 10 and the second fiber-reinforced sheet 20 are dry fiber-reinforced sheets with no or interlayer adhesion. The first fiber-reinforced sheet 10 and the second fiber-reinforced sheet 20 are integrated by being sewn with thread formed of glass fiber or the like. Each of the first fiber-reinforced sheet 10 and the second fiber-reinforced sheet 20 has a plurality of fibers. In the first fiber-reinforced sheet 10 and the second fiber-reinforced sheet 20, the directions in which the fibers extend are different from each other.

Figure 2:
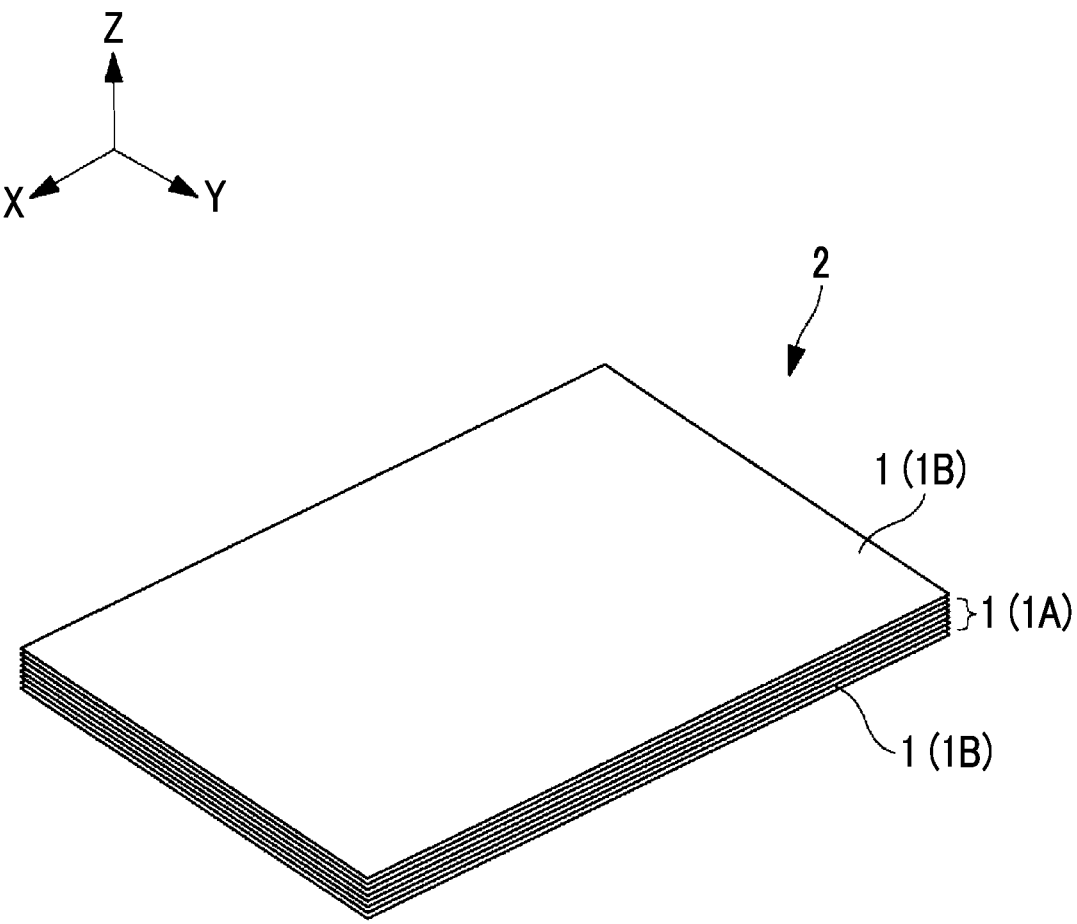
FIG. 2 is a perspective view showing a charge according to an embodiment of the present disclosure.

The charge 2 according to the present embodiment is formed by laminating a plurality of multi-stack materials 1, as shown in FIG. 2. The charge 2 has a flat or nearly flat shape. In FIG. 2, for the sake of illustration, each multi-stack material 1 is shown in the form of one sheet. Details of the multi-stack material 1 configuring the charge 2 will be described later.

Figure 3:
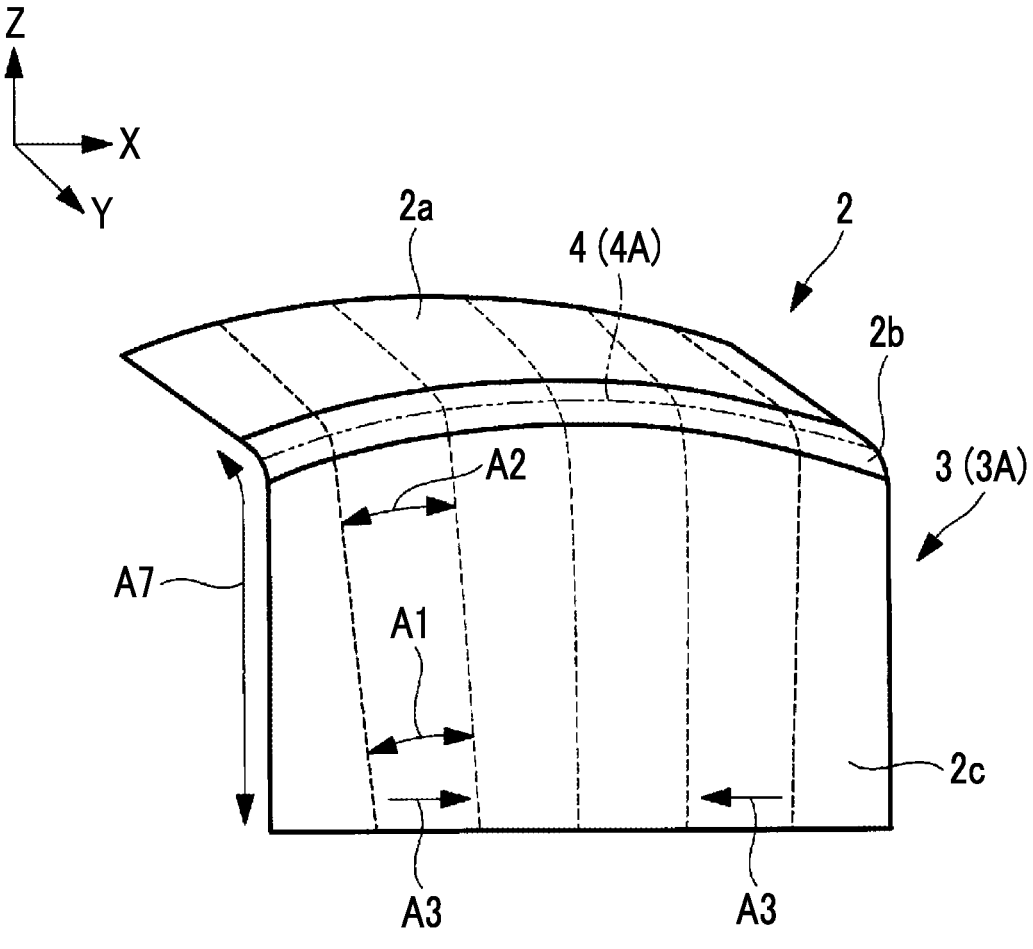
FIG. 3 is a perspective view showing an example of a composite structure according to an embodiment of the present disclosure.
Figure 4:
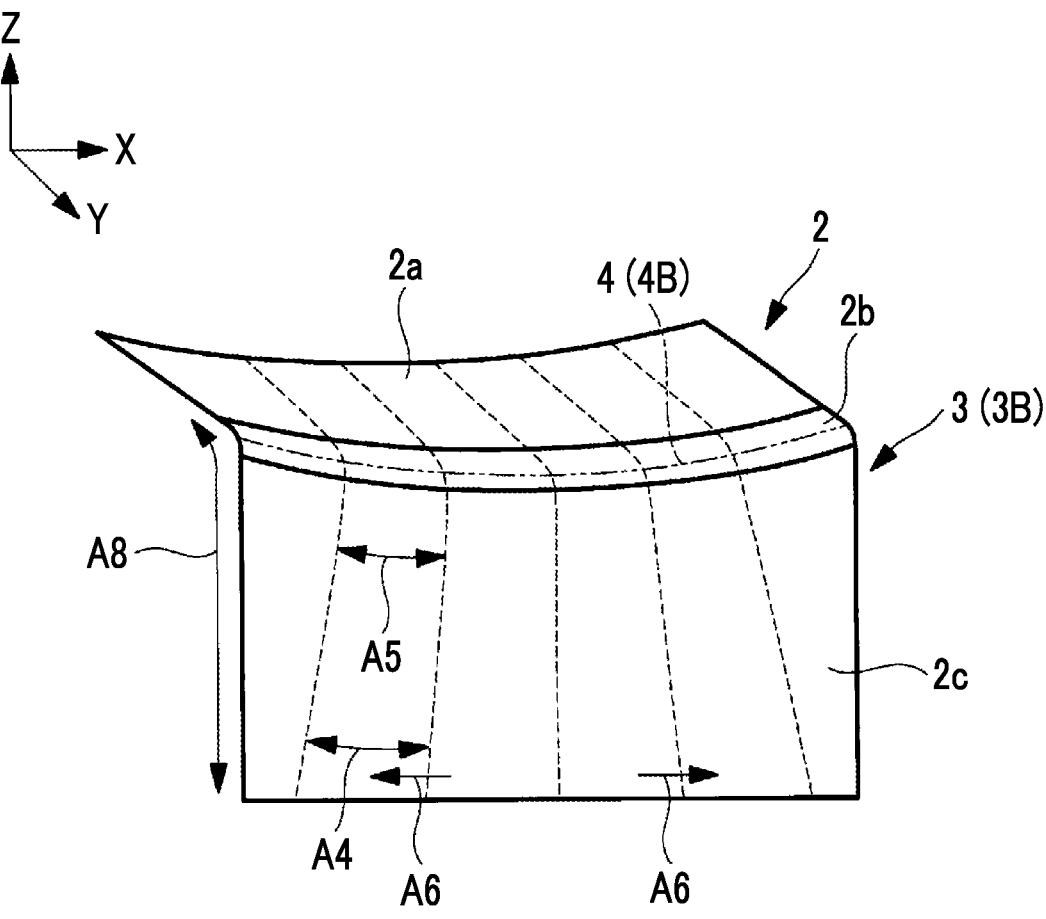
FIG. 4 is a perspective view showing an example of a composite structure according to an embodiment of the present disclosure.

As shown in FIGS. 3 and 4, the composite structure 3 according to the present embodiment is obtained by performing bending on the charge 2 along a bent line 4. In the example of a composite structure 3A shown in FIG. 3, a bent line 4A is curved so as to protrude upward. Further, in the example of a composite structure 3B shown in FIG. 4, a bent line 4B is curved so as to protrude downward. In the following, in a case where it is not necessary to distinguish between the example shown in FIG. 3 and the example shown in FIG. 4, the charge 2, the composite structure 3, and the bent line 4 are simply referred to.

Next, a method for manufacturing the composite structure 3 according to the present embodiment will be described.

First, a plurality of multi-stack materials 1 are manufactured. First, as shown in FIG. 1, the second fiber-reinforced sheet 20 is laminated on the first fiber-reinforced sheet 10. Next, the first fiber-reinforced sheet 10 and the second fiber-reinforced sheet 20 in a laminated state are fixed by sewing them with thread such as glass fiber. In this way, the multi-stack material 1 is manufactured.

Figure 5:
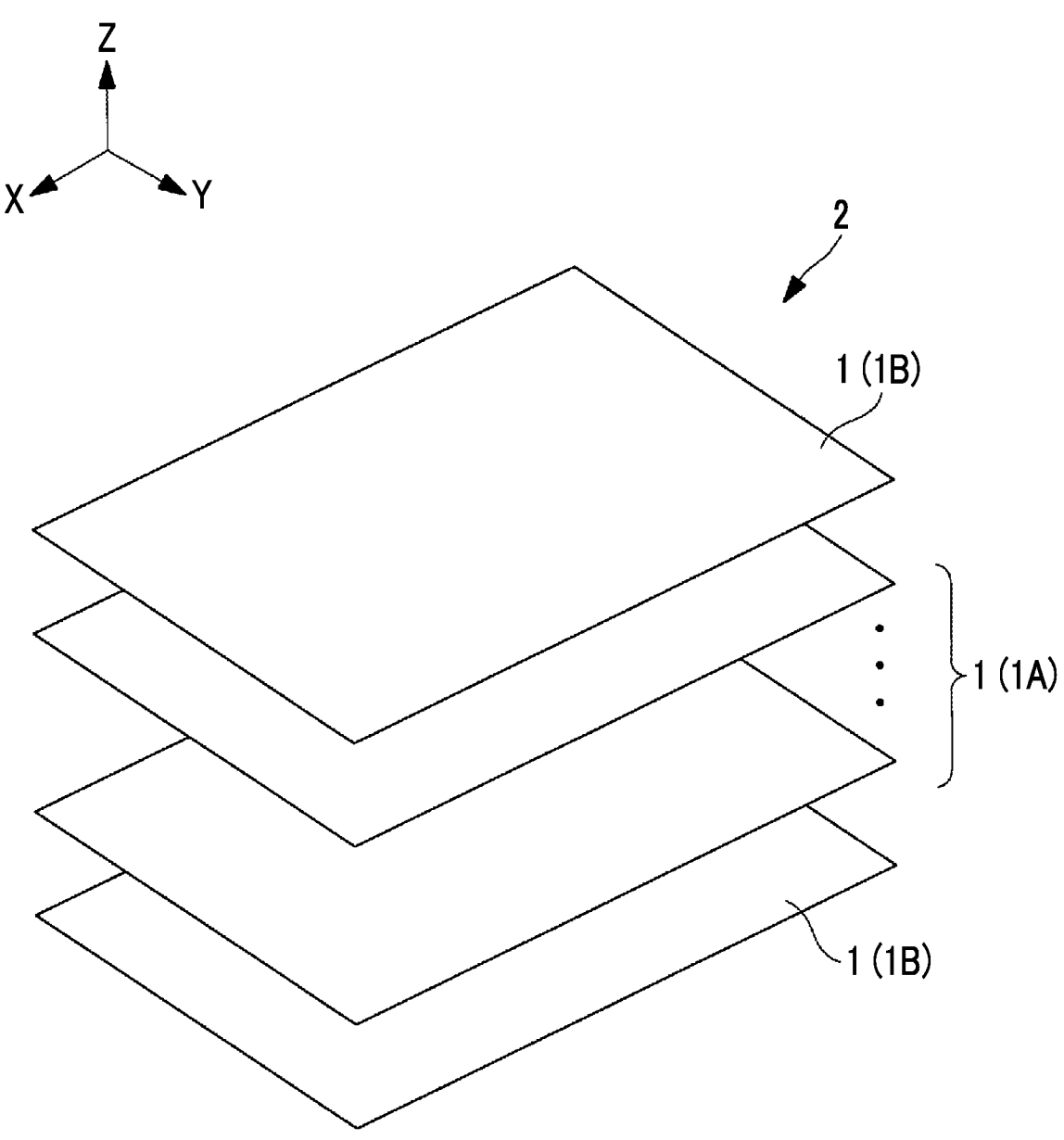
FIG. 5 is a schematic exploded perspective view of the charge shown in FIG. 2.

Next, the charge 2 is manufactured. As shown in FIGS. 2 and 5, the charge 2 having a flat or nearly flat shape is manufactured by laminating a plurality of manufactured multi-stack materials 1.

Figure 6:
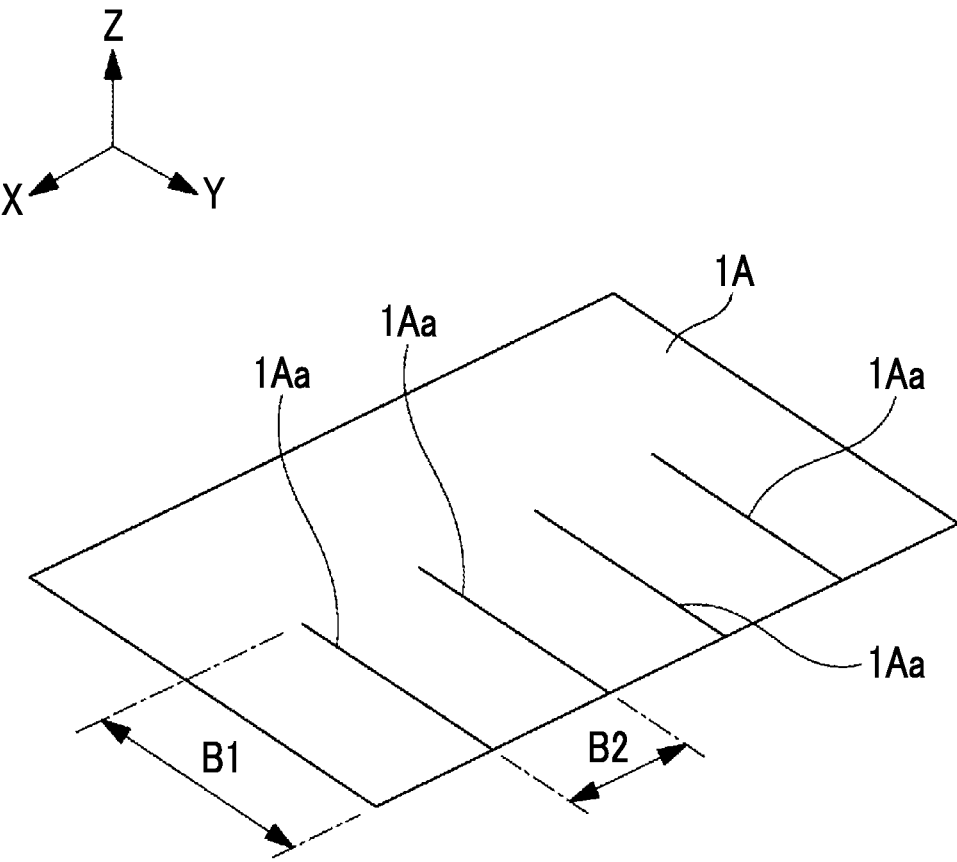
FIG. 6 is a schematic perspective view showing a multi-stack material in which continuous slits are formed.

At this time, as shown in FIG. 6, a plurality of slits 1Aa penetrating in the lamination direction are formed in the multi-stack material 1 that is disposed at an intermediate portion in the lamination direction (the up-down direction in FIG. 5) (hereinafter, referred to as an "intermediate-layer multi-stack material 1A"). The slits 1Aa that are formed in the intermediate-layer multi-stack material (a second fiber-reinforced sheet laminate) 1A extend along the Y-axis direction (a second predetermined direction) from one end in the Y-axis direction. Further, the plurality of slits 1Aa are disposed side by side at equal intervals (intervals B2) along the X-axis direction (a second intersection direction). A length B1 in the Y-axis direction of the slit 1Aa is longer than lengths A7 and A8 (refer to FIGS. 3 and 4) extending over the entire area of a region where a compressive force or a tensile force acts when bending is performed the charge 2. The region where a compressive force or a tensile force acts is a region that is deformed when bending is performed on the charge 2 in order to manufacture the composite structure 3, as indicated by an arrow A7 in FIG. 3 and an arrow A8 in FIG. 4. The region that is deformed when bending is performed means a region that is not fixed when bending is performed. In the examples of FIGS. 3 and 4, a first portion 2a, which is a portion on one end side in the Y-axis direction, is fixed when bending is performed. That is, a deformation portion 2b, which is greatly deformed and includes the bent line 4, and a second portion 2c, which is a portion on the other end side in the Y-axis direction (which can also be called the Z-axis direction as shown in FIGS. 3 and 4 after bending), are not fixed when bending is performed. Therefore, the region that is deformed when bending is performed is a region corresponding to the deformation portion 2b and the second portion 2c.

The slit 1Aa cuts mainly the fibers extending along the X-axis direction.

Further, it is determined whether or not the multi-stack material 1 that is disposed at the most end portion in the lamination direction (the up-down direction in FIG. 5) (Hereinafter referred to as an "outermost-layer multi-stack material 1B") has a fiber-reinforced sheet in which fibers extend along a 0-degree direction. The 0-degree direction is a direction along the direction in which a compressive force acts (refer to an arrow A3 in FIG. 3) or the direction in which a tensile force acts (refer to an arrow A6 in FIG. 4) when bending is performed on the charge 2. That is, in the present embodiment, the 0-degree direction is the X-axis direction.

Figures 7, 8:
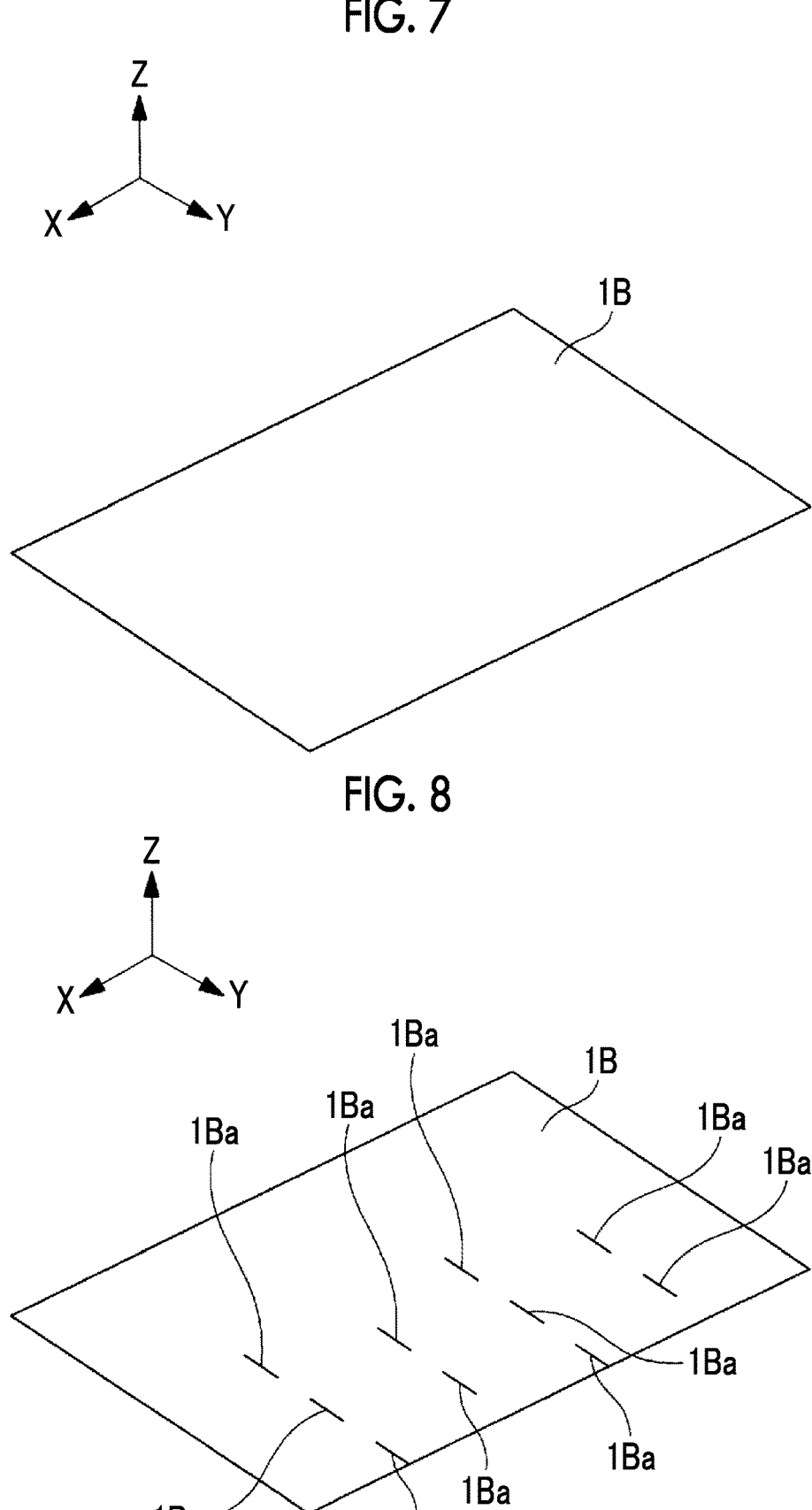
FIG. 7 is a schematic perspective view showing a multi-stack material in which a slit is not formed.
FIG. 8 is a schematic perspective view showing a multi-stack material in which intermittent slits are formed.

In a case where the outermost-layer multi-stack material (a first fiber-reinforced sheet laminate) 1B does not have a fiber-reinforced sheet in which fibers extend along the 0-degree direction (the X-axis direction), a slit is not formed in the multi-stack material 1, as shown in FIG. 7. On the other hand, in a case where the outermost-layer multi-stack material 1B has a fiber-reinforced sheet in which fibers extend along the 0-degree direction (the X-axis direction), a plurality of slits 1Ba penetrating in the lamination direction are formed in the multi-stack material 1, as shown in FIG. 8. Each slit 1Ba extends in the Y-axis direction. Further, the plurality of slits 1Ba are formed in zigzag disposition.

Specifically, the plurality of slits 1Ba are disposed side by side at equal intervals in the Y-axis direction (a first predetermined direction) and the X-axis direction (a first intersection direction). The slit 1Ba cuts mainly the fibers extending along the X-axis direction.

After the charge 2 is manufactured, bending is performed on the charge 2. At this time, as shown in FIGS. 3 and 4, bending is performed such that the bent line 4 is curved.

When bending is performed in this manner, a difference in peripheral length occurs in the charge 2. Specifically, in the example shown in FIG. 3, a peripheral length A1 of the portion far from the bent line 4A becomes shorter than a peripheral length A2 of the portion close to the bent line 4A. In this way, a compressive force acts in the direction indicated by the arrow A3 in the portion having the shorter peripheral length. In the example of FIG. 3, the direction along the bent line 4A is the direction in which the compressive force acts. Further, in the present embodiment, the direction in which the compressive force acts is the 0-degree direction (the X-axis direction) in the multi-stack material 1.

Further, in the example shown in FIG. 4, a peripheral length A4 of the portion far from the bent line 4B becomes longer than a peripheral length A5 of the portion close to the bent line 4B. In this way, a tensile force acts in the direction indicated by the arrow A6 in the portion having a longer peripheral length. In the example of FIG. 4, the direction along the bent line 4B is the direction in which the tensile force acts. Further, in the present embodiment, the direction in which the tensile force acts is the 0-degree direction (the X-axis direction) in the multi-stack material 1.

When the bending on the charge 2 is ended, the manufacturing of the composite structure 3 is completed.

It is not necessary to form the slits 1Aa in the entire intermediate-layer multi-stack material 1A. That is, the slits 1Aa may be formed only in a part of the intermediate-layer multi-stack material 1A. For example, a configuration may be made such that the slits 1Aa are formed in the intermediate-layer multi-stack material 1A that includes a fiber-reinforced sheet in which fibers extend in the 0-degree direction (the X-axis direction) and a slit is not formed in the intermediate-layer multi-stack material 1A that does not include a fiber-reinforced sheet in which fibers extend in the 0-degree direction (the X-axis direction). In this way, it is possible to cut the fibers extending in the 0-degree direction (the X-axis direction), which tend to cause wrinkles when performing bending, so that the shaping-ability of the charge 2 can be improved. Therefore, the occurrence of wrinkles can be suppressed. Further, since the slits 1Aa are formed only in a part of the intermediate-layer multi-stack materials 1A, the manufacturing process of the charge 2 can be simplified compared to a case where the slits 1Aa are formed in the entire intermediate-layer multi-stack material 1A.

According to the present embodiment, the following operation and effects are obtained.

In the present embodiment, in a case where the outermost-layer multi-stack material 1B has a fiber-reinforced sheet in which fibers extend in the direction along the direction in which a compressive force or a tensile force acts when bending is performed on the charge 2, the fibers of the fiber-reinforced sheet can be cut. Therefore, the shaping-ability of the outermost-layer multi-stack material 1B can be improved. Further, in the present embodiment, the plurality of slits 1Ba that are formed in the outermost-layer multi-stack material 1B are formed such that the plurality of slits 1Ba are disposed side by side at predetermined intervals in the X-axis direction and the Y-axis direction. That is, the plurality of slits 1Ba are intermittently formed in the X-axis direction and the Y-axis direction. In this way, in the outermost-layer multi-stack material 1B, it is possible to make it difficult for the laminated fiber-reinforced sheets to come apart. Therefore, the shape of the entire charge 2 can be easily maintained. Therefore, the charge 2 can be easily transported.

Further, in the present embodiment, the plurality of slits 1Aa that are formed in the intermediate-layer multi-stack material 1A that is disposed at the intermediate portion in the lamination direction (the Z-axis direction) are formed such that the length in the Y-axis direction is longer than ● times the interval between the slits 1Aa in the X-axis direction. That is, the plurality of slits 1Aa are formed continuously in the Y-axis direction. In this way, the fibers of the fiber-reinforced sheet that is included in the intermediate-layer multi-stack material 1A can be cut more suitably. Therefore, the shaping-ability of the intermediate-layer multi-stack material 1A can also be improved. Therefore, the shaping-ability of the entire charge 2 can also be improved.

Further, in the present embodiment, in a case where the outermost-layer multi-stack material 1B does not have a fiber-reinforced sheet in which fibers extend in the direction along the direction in which a compressive force or a tensile force acts when bending is performed on the charge 2, a slit is not formed in the outermost-layer multi-stack material 1B. In this way, in this case, in the outermost-layer multi-stack material 1B, it is possible to more suitably make it difficult for the laminated fiber-reinforced sheets to come apart.

Therefore, the shape of the entire charge 2 can be easily maintained more suitably. Therefore, the charge 2 can be easily transported.

Further, in this case, since the outermost-layer multi-stack material 1B does not have a fiber-reinforced sheet in which fibers extend in the direction along the direction in which a compressive force or a tensile force acts when bending is performed on the charge 2, it is possible to maintain predetermined shaping-ability even without forming a slit.

Modification Example

In a case of forming a plurality of slits in the outermost-layer multi-stack material 1B, the plurality of slits may be formed as described below.

Figure 9:
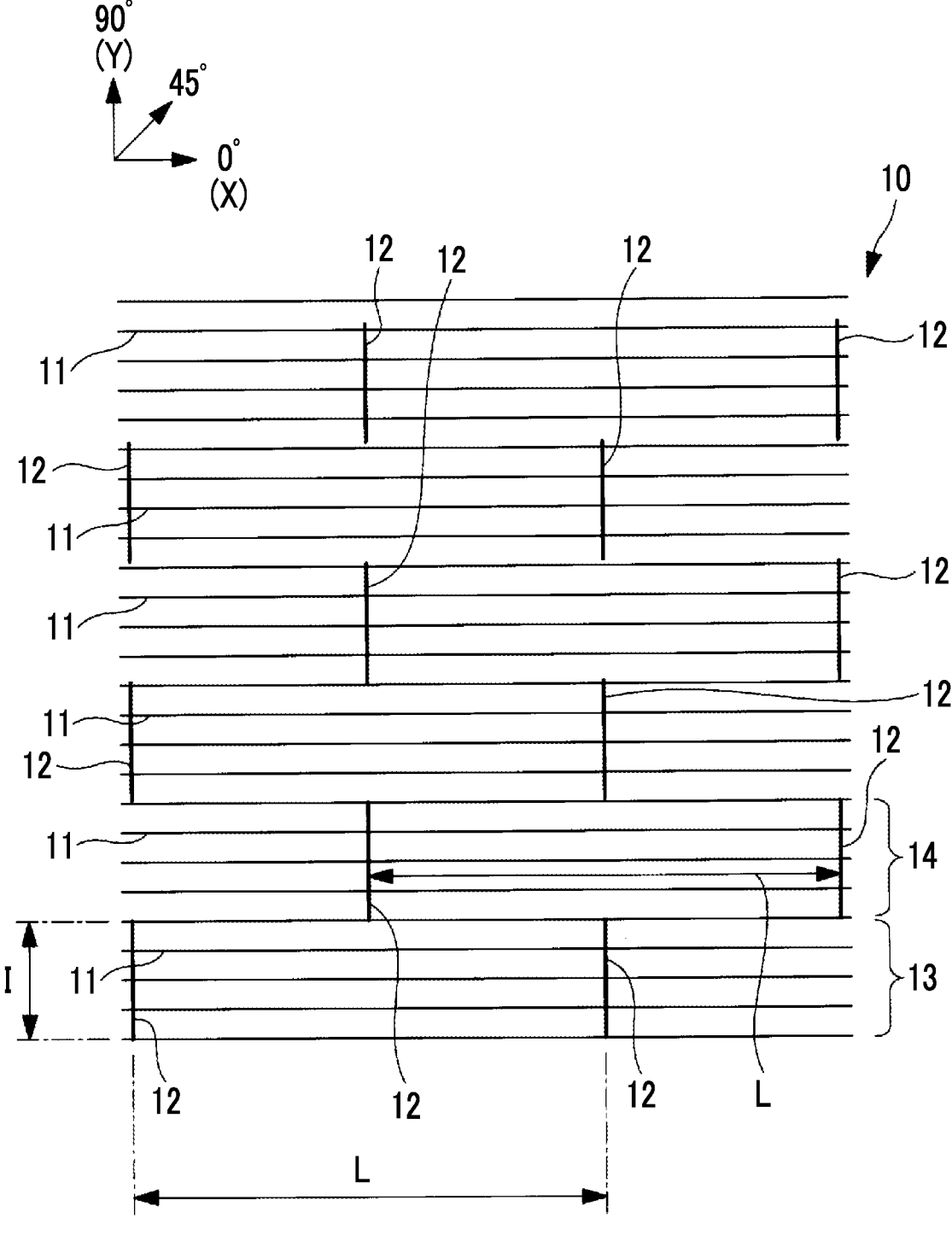
FIG. 9 is a schematic plan view of a first fiber-reinforced sheet that is included in a multi-stack material according to a modification example of the present disclosure.

The first fiber-reinforced sheet 10 according to the present modification example has a plurality of first fibers 11 extending in the 0-degree direction (the X-axis direction), as shown in FIG. 9. As described above, the 0-degree direction is the direction along the direction in which a compressive force acts (refer to an arrow A3 in FIG. 3) or the direction in which a tensile force acts (refer to an arrow A6 in FIG. 4) when bending is performed on the charge 2. The line extending in a right-left direction in FIG. 9 indicates the first fiber 11.

Further, as shown in FIG. 9, the first fiber-reinforced sheet 10 has a plurality of first slits 12 that cut the first fibers 11. Each of the first slits 12 extends in a 90-degree direction (the Y-axis direction). The 90-degree direction is an angle based on the 0-degree direction, and is a direction forming an angle of 90 degrees with respect to the 0-degree direction.

The plurality of first slits 12 are disposed in a zigzag pattern. Further, the plurality of first slits 12 are disposed such that the cut first fibers 11 have the same length. Details of the shape and disposition of the first slit 12 will be described later.

Figure 10:
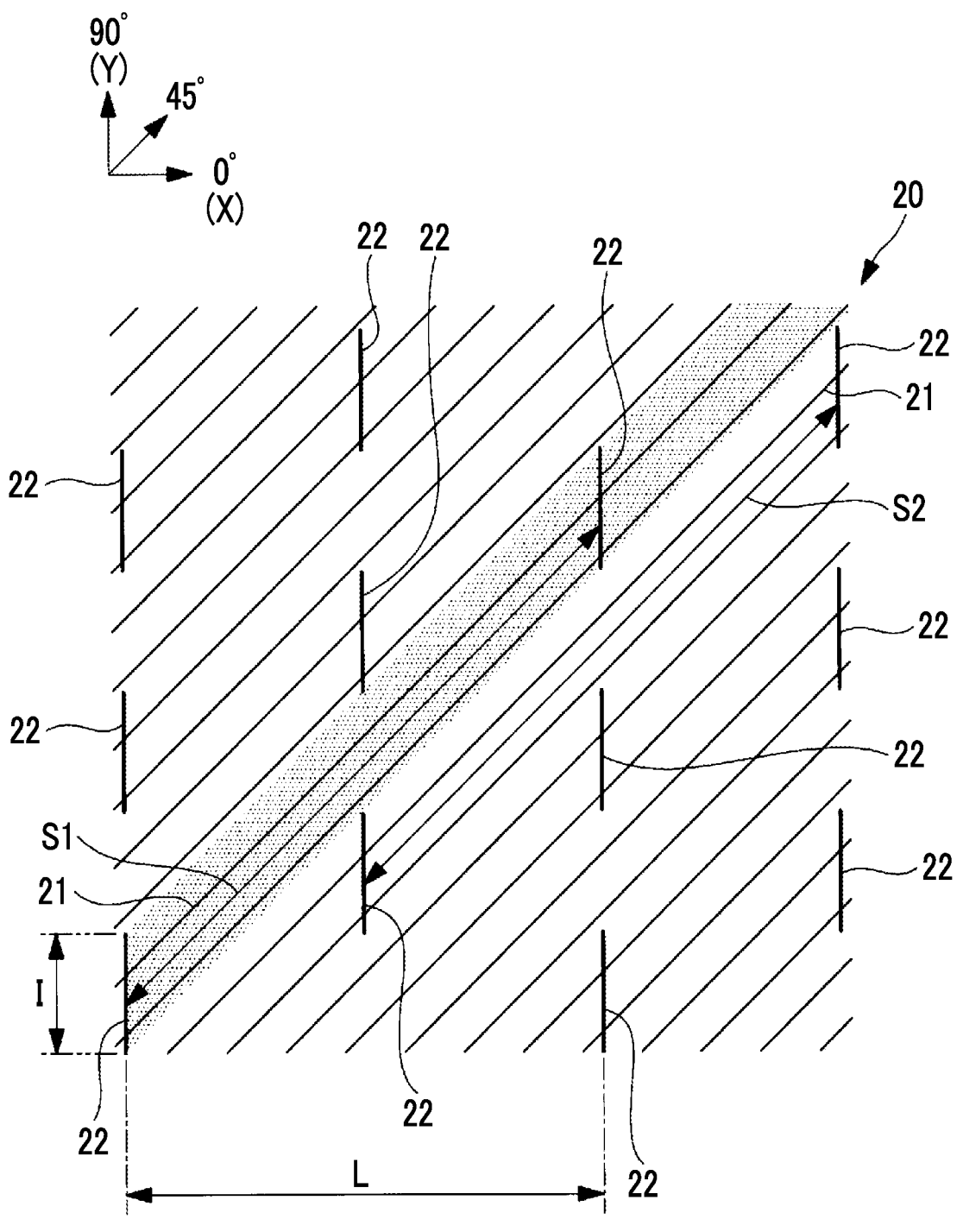
FIG. 10 is a schematic plan view of a second fiber-reinforced sheet that is included in the multi-stack material according to the modification example of the present disclosure.

The second fiber-reinforced sheet 20 according to the present modification example has a plurality of second fibers 21 extending in a 45-degree direction, as shown in FIG. 10. The 45-degree direction is a direction forming an angle of 45 degrees with respect to the 0-degree direction (the X-axis direction) that is the direction in which the first fibers 11 extend. The oblique line in FIG. 10 indicates the second fiber 21.

Further, as shown in FIG. 10, the second fiber-reinforced sheet 20 has a plurality of second slits 22 that cut the second fibers 21. Each of the second slits 22 extends in the 90-degree direction.

The plurality of second slits 22 are disposed in a zigzag pattern. Further, the plurality of second slits 22 are disposed such that the cut second fibers 21 have the same length. Details of the shape and disposition of the second slit 22 will be described later.

Next, the details of the shape and disposition of each of the first slit 12 and the second slit 22 will be described.

The shapes of the first slit 12 and the second slit 22 are made to be the same shape. Further, each of the first slit 12 and the second slit 22 is formed by forming a slit so as to penetrate the multi-stack material 1 (the outermost-layer multi-stack material 1B) in a state where the first fiber-reinforced sheet 10 and the second fiber-reinforced sheet 20 are laminated, in a lamination direction. Therefore, the first slit 12 and the second slit 22 are disposed so as to overlap each other when the multi-stack material 1 is viewed from the lamination direction. Therefore, in the following, the disposition of the plurality of first slits 12 will be described, and the description of the disposition of the plurality of second slits 22 will be omitted.

As shown in FIG. 9, the plurality of first slits 12 are all formed to have the same shape. Each of the first slits 12 has a length 1 in the 90-degree direction (the Y-axis direction).

The first slits 12 are formed over multiple rows in the 90-degree direction (the Y-axis direction). In the present modification example, a first row 13 and a second row 14 are formed so as to be continuous along the 90-degree direction (the Y-axis direction).

The first slits 12 that are formed in the first row 13 are disposed to be spaced apart from each other in the 0-degree direction (the X-axis direction) that is a direction intersecting the 90-degree direction (the Y-axis direction). Further, the first slits 12 that are formed in the first row 13 are disposed side by side at equal intervals (intervals L to be described later) in the 0-degree direction (the X-axis direction).

The first slits 12 that are formed in the second row 14 are also disposed to be spaced apart from each other in the 0-degree direction (the X-axis direction). Further, the first slits 12 that are formed in the second row 14 are disposed side by side at equal intervals (intervals L to be described later) in the 0-degree direction (the X-axis direction). Further, each of the first slits 12 that are formed in the second row 14 is disposed at the midpoint in the 0-degree direction (the X-axis direction) between the first slits 12 formed in the first row 13 adjacent to the second row 14.

Further, one end in the 90-degree direction (the Y-axis direction) of the first slit 12 in the first row 13 and the other end in the 90-degree direction of the first slit 12 in the second row 14 are at the same position in the 90-degree direction (the Y-axis direction). That is, the first slit 12 in the first row 13 and the first slit 12 in the second row 14 are disposed so as not to overlap each other or be separated from each other when viewed from the 0-degree direction (the X-axis direction).

Further, the plurality of first slits 12 and the plurality of second slits 22 are disposed so as to satisfy the following expression (1).

[Expression 1]

$$l = \frac{L}{4n \times \tan\theta} \quad (1)$$

Here, n is any natural number. $\theta$ is an angle that is formed by the direction in which the first fibers 11 extend (the 0-degree direction (the X-axis direction) in the present modification example) and the direction in which the second fibers 21 extend (the 45-degree direction in the present modification example). l is the length in the 90-degree direction (the Y-axis direction) of the first slit 12. L is the interval between the first slits 12 adjacent to each other in the 0-degree direction (the X-axis direction).

In the present modification example, $\theta$ is 45 degrees. Therefore, tan $\theta$ becomes 1. Further, in the present modification example, n is 1.

From the above, if the values of $\theta$ and n are substituted into the above expression (1), the equation, l=L/4, is obtained. That is, the length l of the first slit 12 is a length corresponding to ¼ of L which is the interval between the first slits 12.

According to the present modification example, the following operation and effects are obtained.

In the present modification example, the first slit 12 and the second slit 22 are formed at once by cutting the first fiber-reinforced sheet 10 and the second fiber-reinforced sheet 20 in the laminated state in the lamination direction. Therefore, the first slit 12 and the second slit 22 can be easily formed compared to a case where the first slit 12 and the second slit 22 are formed separately.

Further, in the present modification example, one end in the 90-degree direction (the Y-axis direction) of each of the first slit 12 and the second slit 22 in the first row 13 and the other end in the 90-degree direction (the Y-axis direction) of each of the first slit 12 and the second slit 22 in the second row 14 are at the same position in the 90-degree direction (the Y-axis direction). Further, the disposition of the plurality of first slits 12 and the plurality of second slits 22 is defined by the above expression (1). In this way, in the first fiber-reinforced sheet 10, the first slits 12 can be formed such that the cut first fibers 11 have the same length. Further, in the second fiber-reinforced sheet 20, the second slits 22 can be formed such that the cut second fibers 21 have the same length.

Specifically, one end in the 90-degree direction (the Y-axis direction) of each of the first slit 12 and the second slit 22 in the first row 13 and the other end in the 90-degree direction (the Y-axis direction) of each of the first slit 12 and the second slit 22 in the second row 14 are at the same position in the 90-degree direction (the Y-axis direction). In this way, as shown in FIG. 9, in the first fiber-reinforced sheet 10, both the length of the first fiber 11 in the first row 13 and the length of the first fiber 11 in the second row 14 become L. That is, in the first fiber-reinforced sheet 10, all the first fibers 11 have the same length.

Further, the disposition of the plurality of first slits 12 and the plurality of second slits 22 is defined by the above expression (1). In this way, as shown in FIG. 10, in the second fiber-reinforced sheet 20, a length S1 of the second fiber 21 extending between the specific second slits 22 (the second fiber 21 that is present in a shaded region in FIG. 10) becomes √2(L). Further, a length S2 of the second fiber 21 extending between the other second slits 22 (for example, the second fiber 21 that is present in a region adjacent to the shaded region in FIG. 10) also becomes √2(L). In this manner, in the second fiber-reinforced sheet 20, all the second fibers 21 have the same length.

In this manner, in the present modification example, in the first fiber-reinforced sheet 10 and the second fiber-reinforced sheet 20, the cut first fibers 11 and the cut second fibers 21 can have the same length. Therefore, the lengths of the first fibers 11 and the lengths of the second fibers 21 can be made uniform. Further, since the cut first fiber 11 and the cut second fiber 21 do not have an extremely long length, the length of the first fiber 11 and the length of the second fiber 21 can be set to a predetermined length. Therefore, in any of the first fiber-reinforced sheet 10 and the second fiber-reinforced sheet 20, the strength and the shaping-ability can be made uniform over the entire area, and a predetermined strength and shaping-ability can be secured. Therefore, a decrease in the strength of the multi-stack material 1 can be suppressed. Further, the shaping-ability of the multi-stack material 1 can be improved.

Further, when bending is performed on a fiber-reinforced sheet, there is a case where a compressive force or a tensile force act on the fiber-reinforced sheet (refer to FIGS. 3 and 4). The fibers that are included in the fiber-reinforced sheet are difficult to expand and contract in the extending direction of the fibers. Therefore, in a case where the fibers extend along the direction in which a compressive force or a tensile force acts, the fibers cannot absorb the compressive force or the tensile force, so that wrinkles occur in the fiber-reinforced sheet, and there is a case where the strength of the fiber-reinforced sheet decreases.

In the present modification example, the 0-degree direction (the X-axis direction) in which the first fibers 11 extend and the 45-degree direction in which the second fibers 21 extend are the directions along the direction in which a compressive force or a tensile force acts on the first fiber-reinforced sheet 10 and the second fiber-reinforced sheet 20 when bending is performed on the charge 2. Therefore, the fibers extending in the direction in which a compressive force or a tensile force acts can be cut. Therefore, the shaping-ability of the first fiber-reinforced sheet 10 and the second fiber-reinforced sheet 20 can be improved. Therefore, the occurrence of wrinkles can be suppressed.

The direction along the direction in which the compressive force or the tensile force acts may be a direction other than the direction orthogonal to the direction in which a compressive force or a tensile force acts (the 90-degree direction (the Y-axis direction) in the present modification example).

The present disclosure is not limited to each of the embodiments described above, and can be appropriately modified within a scope which does not depart from the gist of the present disclosure.

For example, in the above embodiments, an example in which a dry fiber-reinforced sheet is used as the fiber-reinforced sheet has been described. However, the present disclosure is not limited to this. For example, as the fiber-reinforced sheet, a fiber-reinforced sheet (for example, prepreg or the like) in which fibers are infiltrated with resin may be used.

The laminate structure and the method for manufacturing a laminate structure described in each embodiment are grasped, for example, as follows.

The laminate structure according to an aspect of the present disclosure is a laminate structure (2) that is obtained by laminating a plurality of fiber-reinforced sheet laminates (1), in each of which a plurality of fiber-reinforced sheets (10, 20) are laminated, the laminate structure including: a first fiber-reinforced sheet laminate (1B) that is the fiber-reinforced sheet laminate which is disposed at an end portion in a lamination direction; and a second fiber-reinforced sheet laminate (1A) that is the fiber-reinforced sheet laminate which is disposed at an intermediate portion in the lamination direction, in which the first fiber-reinforced sheet laminate has the fiber-reinforced sheet in which fibers extend in a direction (the X-axis direction) along a direction in which a compressive force or a tensile force acts when bending is performed on the laminate structure, and is formed with a plurality of slits (1Ba) penetrating in the lamination direction and extending in a first predetermined direction (the Y-axis direction), the plurality of slits that are formed in the first fiber-reinforced sheet laminate are disposed side by side at predetermined intervals in the first predetermined direction and a first intersection direction (the X-axis direction) that is a direction intersecting the first predetermined direction, the second fiber-reinforced sheet laminate is formed with a slit (1Aa) penetrating in the lamination direction and extending in a second predetermined direction (the Y-axis direction), and the slit that is formed in the second fiber-reinforced sheet laminate is formed such that a length in the second predetermined direction of the slit has a length extending over substantially the entire area of a region where a compressive force or a tensile force acts when bending is performed on the laminate structure.

In the above configuration, the slits penetrating in the lamination direction are formed in the first fiber-reinforced sheet laminate which is disposed at the end portion in the lamination direction. In this way, all the fibers that are included in the first fiber-reinforced sheet laminate and extend in the direction in which a compressive force or a tensile force acts can be cut. Therefore, the shaping-ability of the first fiber-reinforced sheet laminate can be improved. Further, in the above configuration, the plurality of slits that are formed in the first fiber-reinforced sheet laminate are disposed side by side at predetermined intervals in the first predetermined direction and the first intersection direction. That is, the plurality of slits are intermittently formed in the first predetermined direction and the first intersection direction. In this way, in the first fiber-reinforced sheet laminate that is disposed at the end portion (in other words, a surface layer) of the laminate structure, it is possible to make it difficult for the laminated fiber-reinforced sheets to come apart. Therefore, it is possible to easily maintain the shape of the entire laminate structure. Therefore, the laminate structure can be easily transported.

Further, in the above configuration, the slit that is formed in the second fiber-reinforced sheet laminate that is disposed at the intermediate portion in the lamination direction is formed such that the length in the second predetermined direction has a length extending over substantially the entire area of the region where a compressive force or a tensile force acts when bending is performed on the laminate structure. That is, the slit is formed continuously in the second predetermined direction. In this way, the fibers of the fiber-reinforced sheets that are included in the second fiber-reinforced sheet laminate can be cut more suitably. Therefore, the shaping-ability of the second fiber-reinforced sheet laminate can be improved. Therefore, the shaping-ability of the entire laminate structure can be improved.

Further, in the laminate structure according to an aspect of the present disclosure, the plurality of slits that are formed in the first fiber-reinforced sheet laminate are formed over multiple rows in the first predetermined direction, the slits that are formed in a first row (13) in the first predetermined direction are disposed to be spaced apart from each other in the first predetermined direction and the first intersection direction, and the slit that is formed in a second row (14) in the first predetermined direction is disposed at the midpoint in the first intersection direction between the slits formed in the first row.

In the above configuration, in the first fiber-reinforced sheet laminate, the plurality of slits can be disposed to be suitably spaced apart from each other in the first predetermined direction and the first intersection direction. Therefore, the shaping-ability of the first fiber-reinforced sheet laminate can be suitably improved. Further, in the first fiber-reinforced sheet laminate, it is possible to make it difficult for the suitably laminated fiber-reinforced sheets to come apart. Therefore, it is possible to easily maintain the shape of the entire laminate structure. Therefore, the laminate structure can be easily transported.

The method for manufacturing a laminate structure according to an aspect of the present disclosure is a method for manufacturing a laminate structure (2) that is obtained by laminating a plurality of fiber-reinforced sheet laminates (1), in each of which a plurality of fiber-reinforced sheets (10, 20) are laminated, the method including: a first fiber-reinforced sheet laminate slitting step of forming a plurality of slits (1Ba) penetrating in a lamination direction and extending in a first predetermined direction (the Y-axis direction) in a first fiber-reinforced sheet laminate (1B) that is the fiber-reinforced sheet laminate which is disposed at an end portion in the lamination direction in a case where the first fiber-reinforced sheet laminate has the fiber-reinforced sheet in which fibers extend in a direction (the X-axis direction) along a direction in which a compressive force or a tensile force acts when bending is performed on the laminate structure; and a second fiber-reinforced sheet laminate slitting step of forming a slit (1Aa) penetrating in the lamination direction and extending in a second predetermined direction (the Y-axis direction) in a second fiber-reinforced sheet laminate (1A) that is the fiber-reinforced sheet laminate which is disposed at an intermediate portion in the lamination direction, in which in the first fiber-reinforced sheet laminate slitting step, the plurality of slits are formed so as to be disposed side by side at predetermined intervals in the first predetermined direction and a first intersection direction (the X-axis direction) that is a direction intersecting the first predetermined direction, and in the second fiber-reinforced sheet laminate slitting step, the slit is formed such that a length in the second predetermined direction of the slit has a length extending over substantially the entire area of a region where a compressive force or a tensile force acts when bending is performed on the laminate structure.

In the above configuration, in a case where the first fiber-reinforced sheet laminate that is the fiber-reinforced sheet laminate which is disposed at the end portion in the lamination direction has a fiber-reinforced sheet in which fibers extend in the direction along the direction in which a compressive force or a tensile force acts when bending is performed on the laminate structure, the fibers of the fiber-reinforced sheet can be cut. Therefore, the shaping-ability of the first fiber-reinforced sheet laminate can be improved. Further, in the above configuration, the plurality of slits that are formed in the first fiber-reinforced sheet laminate are formed such that the plurality of slits are disposed side by side at predetermined intervals in the first predetermined direction and the first intersection direction. That is, the plurality of slits are intermittently formed in the first predetermined direction and the first intersection direction. In this way, in the first fiber-reinforced sheet laminate that is disposed at the end portion (in other words, a surface layer) of the laminate structure, it is possible to make it difficult for the laminated fiber-reinforced sheets to come apart. Therefore, it is possible to easily maintain the shape of the entire laminate structure. Therefore, the laminate structure can be easily transported.

Further, in the above configuration, the slit that is formed in the second fiber-reinforced sheet laminate that is disposed at the intermediate portion in the lamination direction is formed such that the length in the second predetermined direction has a length extending over substantially the entire area of the region where a compressive force or a tensile force acts when bending is performed on the laminate structure. That is, the slit is formed continuously in the second predetermined direction. In this way, the fibers of the fiber-reinforced sheets that are included in the second fiber-reinforced sheet laminate can be cut more suitably. Therefore, the shaping-ability of the second fiber-reinforced sheet laminate can be improved. Therefore, the shaping-ability of the entire laminate structure can be improved.

Further, in the method for manufacturing a laminate structure according to an aspect of the present disclosure, in the first fiber-reinforced sheet laminate slitting step, the plurality of slits are formed over multiple rows in the first predetermined direction, the slits that are formed in a first row (13) in the first predetermined direction are disposed to be spaced apart from each other in the first intersection direction, and the slit that is formed in a second row (14) in the first predetermined direction is disposed at the midpoint in the first intersection direction between the slits formed in the first row.

In the above configuration, in the first fiber-reinforced sheet laminate, the plurality of slits can be disposed to be suitably spaced apart from each other in the first predetermined direction and the first intersection direction. Therefore, the shaping-ability of the first fiber-reinforced sheet laminate can be suitably improved. Further, in the first fiber-reinforced sheet laminate, it is possible to make it difficult for the suitably laminated fiber-reinforced sheets to come apart. Therefore, it is possible to easily maintain the shape of the entire laminate structure. Therefore, the laminate structure can be easily transported.

Further, the method for manufacturing a laminate structure according to an aspect of the present disclosure further includes: a step of not forming a slit in the first fiber-reinforced sheet laminate in a case where the first fiber-reinforced sheet laminate does not have the fiber-reinforced sheet in which fibers extend in a direction along a direction in which a compressive force or a tensile force acts when bending is performed on the laminate structure.

In the above configuration, in a case where the first fiber-reinforced sheet laminate does not have the fiber-reinforced sheet in which fibers extend in the direction along the direction in which a compressive force or a tensile force acts when bending is performed on the laminate structure, a slit is not formed in the first fiber-reinforced sheet laminate. In this way, in this case, in the first fiber-reinforced sheet laminate that is disposed at the end portion (in other words, a surface layer) of the laminate structure, it is possible to more suitably make it difficult for the laminated fiber-reinforced sheets to come apart. Therefore, the shape of the entire laminate structure can be easily maintained more suitably. Therefore, the laminate structure can be easily transported.

Further, in this case, since the first fiber-reinforced sheet laminate does not have the fiber-reinforced sheet in which fibers extend in the direction along the direction in which a compressive force or a tensile force acts when bending is performed on the laminate structure, it is possible to maintain predetermined shaping-ability even without forming a slit.

REFERENCE SIGNS LIST

1: multi-stack material (fiber-reinforced sheet laminate)
1A: multi-stack material (second fiber-reinforced sheet laminate)
1Aa: slit
1B: multi-stack material (first fiber-reinforced sheet laminate)
1Ba: slit
2: charge (laminate structure)
3: composite structure
3A: composite structure
3B: composite structure
4: bent line
4A: bent line
4B: bent line
10: first fiber-reinforced sheet
11: first fiber
12: first slit
13: first row
14: second row
20: second fiber-reinforced sheet
21: second fiber
22: second slit

The invention claimed is:

1. A laminate structure that is obtained by laminating a plurality of fiber-reinforced sheet laminates, in each of which a plurality of fiber-reinforced sheets are laminated, the laminate structure comprising:
   a first fiber-reinforced sheet laminate that is the fiber-reinforced sheet laminate which is disposed at an end portion in a lamination direction; and
   a second fiber-reinforced sheet laminate that is the fiber-reinforced sheet laminate which is disposed at an intermediate portion in the lamination direction,
   wherein the first fiber-reinforced sheet laminate has the fiber-reinforced sheet in which fibers extend in a direction along a direction in which a compressive force or a tensile force acts when bending is performed on the laminate structure, and is formed with a plurality of slits penetrating in the lamination direction and extending in a first predetermined direction,
   the plurality of slits that are formed in the first fiber-reinforced sheet laminate are disposed side by side at predetermined intervals in the first predetermined direction and a first intersection direction that is a direction intersecting the first predetermined direction,
   the second fiber-reinforced sheet laminate is formed with a slit penetrating in the lamination direction and extending in a second predetermined direction, and
   the slit that is formed in the second fiber-reinforced sheet laminate is formed such that a length in the second predetermined direction of the slit has a length extending over substantially an entire area of a region where a compressive force or a tensile force acts when bending is performed on the laminate structure, and the slit is formed continuously over substantially the entire area of the region without interruption along the second predetermined direction,
   wherein the region where the compressive force or the tensile force acts when bending is performed is a deformable region that is not fixed during bending, the deformable region comprising:

a deformation portion that includes a bent line and is subject to substantial deformation; and a second portion that is contiguous with the deformation portion on a side opposite a fixed first portion.

2. The laminate structure according to claim 1, wherein the plurality of slits that are formed in the first fiber-reinforced sheet laminate are formed over multiple rows in the first predetermined direction, the slits that are formed in a first row in the first predetermined direction are disposed to be spaced apart from each other in the first predetermined direction and the first intersection direction, and the slit that is formed in a second row in the first predetermined direction is disposed at a midpoint in the first intersection direction between the slits formed in the first row.

3. A method for manufacturing a laminate structure that is obtained by laminating a plurality of fiber-reinforced sheet laminates, in each of which a plurality of fiber-reinforced sheets are laminated, the method comprising:

a first fiber-reinforced sheet laminate slitting step of forming a plurality of slits penetrating in a lamination direction and extending in a first predetermined direction in a first fiber-reinforced sheet laminate that is the fiber-reinforced sheet laminate which is disposed at an end portion in the lamination direction in a case where the first fiber-reinforced sheet laminate has the fiber-reinforced sheet in which fibers extend in a direction along a direction in which a compressive force or a tensile force acts when bending is performed on the laminate structure; and a second fiber-reinforced sheet laminate slitting step of forming a slit penetrating in the lamination direction and extending in a second predetermined direction in a second fiber-reinforced sheet laminate that is the fiber-reinforced sheet laminate which is disposed at an intermediate portion in the lamination direction,

wherein in the first fiber-reinforced sheet laminate slitting step, the plurality of slits are formed so as to be disposed side by side at predetermined intervals in the first predetermined direction and a first intersection direction that is a direction intersecting the first predetermined direction, and in the second fiber-reinforced sheet laminate slitting step, the slit is formed such that a length in the second predetermined direction of the slit has a length extending over substantially an entire area of a region where a compressive force or a tensile force acts when bending is performed on the laminate structure, wherein the region where the compressive force or the tensile force acts when bending is performed is a deformable region that is not fixed during bending, the deformable region comprising:

a deformation portion that includes a bent line and is subject to substantial deformation; and a second portion that is contiguous with the deformation portion on a side opposite a fixed first portion.

4. The method for manufacturing a laminate structure according to claim 3, wherein in the first fiber-reinforced sheet laminate slitting step, the plurality of slits are formed over multiple rows in the first predetermined direction, the slits that are formed in a first row in the first predetermined direction are disposed to be spaced apart from each other in the first intersection direction, and the slit that is formed in a second row in the first predetermined direction is disposed at a midpoint in the first intersection direction between the slits formed in the first row.

5. The method for manufacturing a laminate structure according to claim 3, further comprising:

a step of not forming a slit in the first fiber-reinforced sheet laminate in a case where the first fiber-reinforced sheet laminate does not have the fiber-reinforced sheet in which fibers extend in a direction along a direction in which a compressive force or a tensile force acts when bending is performed on the laminate structure.

* * * * *